US008676746B2

(12) United States Patent
Tsai et al.

(10) Patent No.: US 8,676,746 B2
(45) Date of Patent: Mar. 18, 2014

(54) DATABASE MANAGEMENT SYSTEM RISK ASSESSMENT

(75) Inventors: Kevin Tsai, Oakland, CA (US); Bob Ham, Atlanta, GA (US); Yun Wu, New York, NY (US); Dwayne Lanclos, Euless, TX (US); Venkata Raj Pochiraju, Bloomingdale, IL (US)

(73) Assignee: Microsoft Corporation, Redmond, WA (US)

( * ) Notice: Subject to any disclaimer, the term of this patent is extended or adjusted under 35 U.S.C. 154(b) by 1215 days.

(21) Appl. No.: 11/968,653

(22) Filed: Jan. 3, 2008

(65) Prior Publication Data
US 2009/0248753 A1 Oct. 1, 2009

(51) Int. Cl.
*G06F 7/00* (2006.01)
*G06F 17/00* (2006.01)

(52) U.S. Cl.
USPC ............................ 707/603; 707/600; 707/758

(58) Field of Classification Search
None
See application file for complete search history.

(56) References Cited

U.S. PATENT DOCUMENTS

| | | | | |
|---|---|---|---|---|
| 5,727,196 | A * | 3/1998 | Strauss et al. | 707/696 |
| 5,832,496 | A | 11/1998 | Anand et al. | |
| 5,926,812 | A * | 7/1999 | Hilsenrath et al. | 707/737 |
| 6,173,290 | B1 * | 1/2001 | Goldberg | 707/687 |
| 6,980,927 | B2 | 12/2005 | Tracy et al. | |
| 7,130,779 | B2 | 10/2006 | Beverina et al. | |
| 7,346,687 | B2 * | 3/2008 | Lipscomb et al. | 707/999.01 |
| 7,676,525 | B2 * | 3/2010 | Stefani et al. | 707/808 |
| 7,685,092 | B2 * | 3/2010 | Reichert et al. | 707/999.001 |
| 2002/0099586 | A1 | 7/2002 | Bladen et al. | |
| 2002/0169865 | A1 * | 11/2002 | Tarnoff | 709/223 |
| 2003/0120589 | A1 | 6/2003 | Williams et al. | |
| 2003/0187688 | A1 | 10/2003 | Fey et al. | |
| 2004/0193560 | A1 * | 9/2004 | Atamer | 707/3 |
| 2007/0050178 | A1 | 3/2007 | Linzey et al. | |
| 2007/0276631 | A1 * | 11/2007 | Subramanian et al. | 707/104.1 |
| 2008/0208868 | A1 * | 8/2008 | Hubbard | 707/10 |
| 2008/0215474 | A1 * | 9/2008 | Graham | 707/100 |
| 2009/0150438 | A1 * | 6/2009 | Markisohn et al. | 707/104.1 |

OTHER PUBLICATIONS

Keane Scores, "Business Risk Management Solutions" Dated:2005, pp. 1-12.
World Customs Organization, "A national valuation database as a risk assessment tool" Dated: Dec. 2004, pp. 1-14.
ISAserver.org, Event Log Monitoring, Editors' Pick: GFI EventsManager Listing updated: Jan. 3, 2007, downloaded from <http://www.isaserver.org/software/W2K/Event-Log-Monitoring/> on Jun. 12, 2007, 5 pages.
IBM, Gruppo Banca Lombarda implements new credit risk assessment to comply with international guidelines, Sep. 28, 2006, 4 pages.
RiskWorld Software: computer programs for risk assessment and risk management, downloaded from <http://www.riskworld.com/SOFTWARE/SW5SW001.HTM> on Jun. 12, 2007, 54 pages.

* cited by examiner

*Primary Examiner* — Jau-Shya Meng
(74) *Attorney, Agent, or Firm* — Jim Sfekas; Kate Drakos; Micky Minhas

(57) ABSTRACT

A method of evaluating an implementation of a DBMS is provided. The method comprises collecting data associated with the implementation of the DBMS and accessing a database comprising problems and their associated solutions, wherein the solutions are configured to remedy at least one of the problems. The method further comprises comparing the data associated with the implementation of the DBMS with the problems and identifying at least one problem associated with the DBMS. Finally, a DBMS risk assessment report is generated that identifies the problem associated with the DBMS and a solution configured to remedy the problem.

20 Claims, 8 Drawing Sheets

DATABASE MANAGEMENT SYSTEM RISK ASSESSMENT

TECHNICAL FIELD

The technology relates to the field of risk assessment of implementations of various technologies.

BACKGROUND

A database management system (DBMS) is a system generally used to manage tasks relating to creating, maintaining, organizing, or retrieving information from a database. Generally, a DBMS utilizes one or more servers to query an information database for requested data. For example, a DBMS may be used to manage user requests for information that is stored in an information database, and the DBMS may utilize one or more servers to administer data queries and generate responses in response to such requests.

Many DBMSs are configured to implement a querying paradigm for accessing, manipulating and managing data stored in a comprehensive database of information. An example of such a paradigm is SQL ("Structured Query Language"), which comprises a set of statements used to retrieve and update data stored in a database, and is often described as a declarative language used with "SQL databases." SQL is also utilized for database schema creation and modification, as well as for database object access control and management.

From the time of the initial inception and subsequent implementation of a particular querying paradigm, newer paradigms may be created that have different features or that are otherwise configured differently. For instance, although originally designed for executing declarative queries and data manipulation, newer versions of SQL have been developed that add procedural programming language functionality, such as control-of-flow constructs. In addition some variations of the language support user-defined data types and other language extensions.

A DBMS is generally a powerful means for querying a database for a specific record and returning that record to a user. However, various implementations of querying paradigms such as SQL are often inconsistent and/or incompatible. In addition, a DBMS may experience performance and recovery problems, as well as security threats, as a result of a faulty configuration or maintenance of a server associated with the DBMS.

SUMMARY

This Summary is provided to introduce a selection of concepts that are further described below in the Detailed Description. This Summary is not intended to identify key features or essential features of the claimed subject matter, nor is it intended to be used as an aid in determining the scope of the claimed subject matter.

A method of evaluating an implementation of a DBMS is provided. The method comprises collecting data associated with the implementation of the DBMS and accessing a database comprising problems and their associated solutions, wherein the solutions are configured to remedy at least one of the problems. The method further comprises comparing the data associated with the implementation of the DBMS with the problems and identifying at least one problem associated with the DBMS. Finally, a DBMS risk assessment report is generated that identifies the problem associated with the DBMS and a solution configured to remedy the problem.

DESCRIPTION OF THE DRAWINGS

The accompanying drawings, which are incorporated in and form a part of this specification, illustrate embodiments of the technology for DBMS risk assessment and, together with the description, serve to explain principles discussed below.

The drawings referred to in this description should be understood as not being drawn to scale except if specifically noted.

DETAILED DESCRIPTION

Reference will now be made in detail to embodiments of the present technology for DBMS risk assessment, examples of which are illustrated in the accompanying drawings. While the technology for DBMS risk assessment will be described in conjunction with various embodiments, it will be understood that they are not intended to limit the present technology for DBMS risk assessment to these embodiments. On the contrary, the presented technology for DBMS risk assessment is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology for DBMS risk assessment. However, the present technology for DBMS risk assessment may be practiced without these specific details. In other instances, well known methods, procedures, components, and circuits have not been described in detail as not to unnecessarily obscure aspects of the present embodiments.

It should be understood that discussions throughout the present detailed description that utilize terms such as "using", "utilizing", "implementing", "mapping", "routing", "interfacing", "recognizing", "representing", "detecting", "converting", "authenticating", "communicating", "sharing", "receiving", "performing", "generating", "displaying", "enabling", "aggregating", "highlighting", "presenting", "configuring", "identifying", "reporting", "ensuring", "suppressing", "disabling", "ending", "providing", and "accessing" or the like, may refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for DBMS risk assessment is also well suited to the use of other computer systems such as, for example, optical and mechanical computers.

The foregoing notwithstanding, it should be further appreciated that the aforementioned terms may also refer to manual actions or processes. Indeed, various embodiments of the present technology implement a combination of one or more computer-implemented actions or processes with one or more manual actions or processes.

Example Computer System Environment

Figure 1:
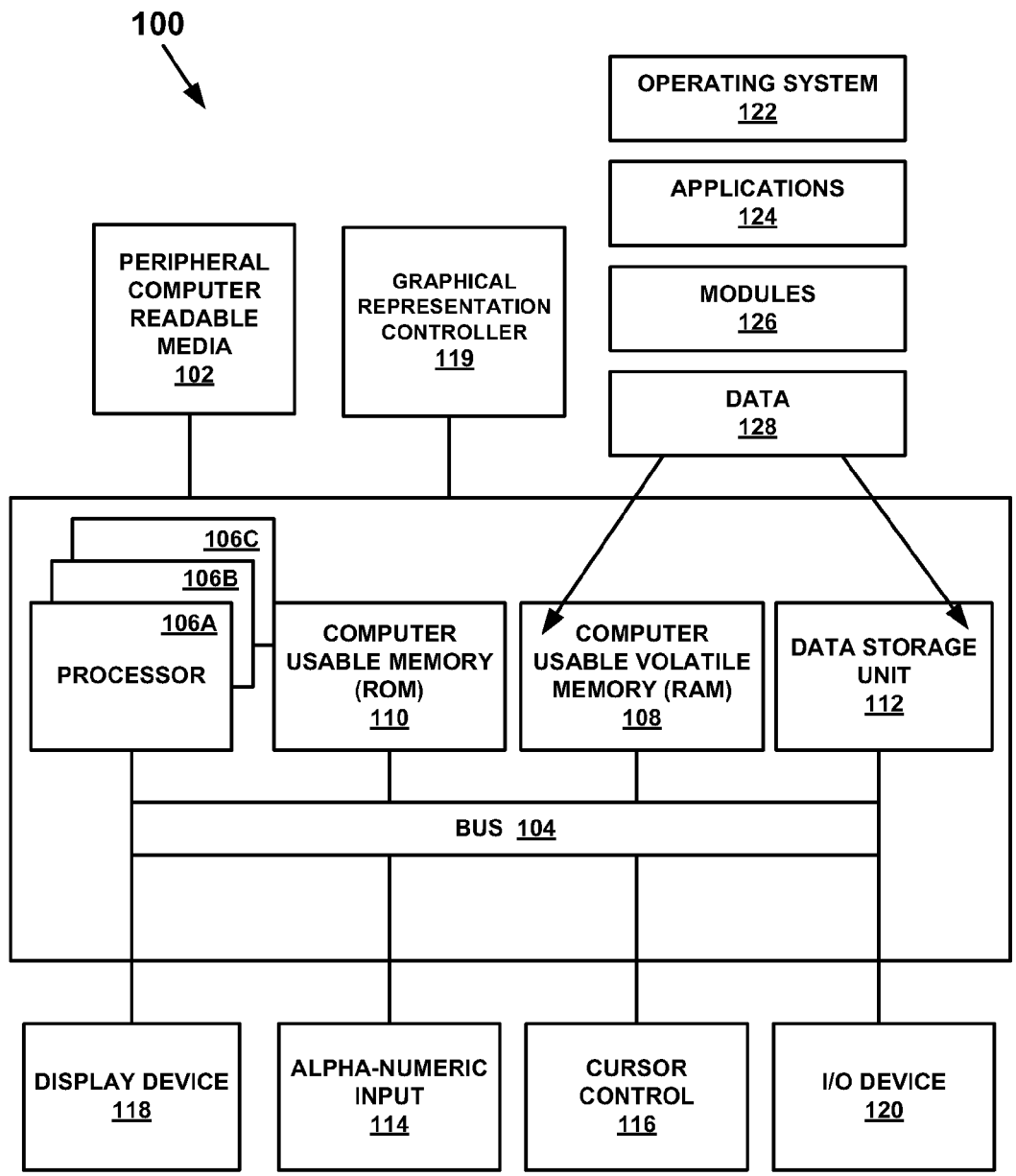
FIG. 1 is a diagram of an exemplary computer system used in accordance with an embodiment of the present technology for DBMS risk assessment.

With reference now to FIG. 1, portions of the technology for DBMS risk assessment are composed of computer-readable and computer-executable instructions that reside, for example, in computer-usable media of a computer system. That is, FIG. 1 illustrates one example of a type of computer that can be used to implement embodiments, which are discussed below, of the present technology for DBMS risk assessment.

FIG. 1 illustrates an exemplary computer system 100 used in accordance with embodiments of the present technology for DBMS risk assessment. It is appreciated that system 100 of FIG. 1 is exemplary only and that the present technology for DBMS risk assessment can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled therewith.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled with bus 104 for storing information and instructions for processors 106A, 106B, and 106C.

System 100 also includes computer usable non-volatile memory 110, such as read only memory (ROM), coupled with bus 104 for storing static information and instructions for processors 106A, 106B, and 106C. Also present in system 100 is a data storage unit 112 (e.g., a magnetic or optical disk and disk drive) coupled with bus 104 for storing information and instructions. System 100 also includes an optional alphanumeric input device 114 including alphanumeric and function keys coupled with bus 104 for communicating information and command selections to processor 106A or processors 106A, 106B, and 106C. System 100 also includes an optional cursor control device 116 coupled with bus 104 for communicating user input information and command selections to processor 106A or processors 106A, 106B, and 106C. System 100 of the present embodiment also includes an optional display device 118 coupled with bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. System 100 may also include a graphical representation controller module 119 for enabling generation of graphical representations of portions of aggregated on-line security information from a plurality of sources.

Optional cursor control device 116 allows the computer user to dynamically signal the movement of a visible symbol (cursor) on display device 118. Many implementations of cursor control device 116 are known in the art including a trackball, mouse, touch pad, joystick or keys on alpha-numeric input device 114 capable of signaling movement of a given direction or manner of displacement. Alternatively, it will be appreciated that a cursor can be directed and/or activated via input from alpha-numeric input device 114 using keys and sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for DBMS risk assessment, for example, is stored as an application 124 or module 126 in memory locations within memory 108 and memory areas within data storage unit 112.

The computing system 100 is only one example of a suitable computing environment and is not intended to suggest any limitation as to the scope of use or functionality of the present technology. Neither should the computing system 100 be interpreted as having any dependency or requirement relating to any one or combination of components illustrated in the computing system 100.

The present technology is operational with numerous other general-purpose or special-purpose computing system environments or configurations. Examples of well known computing systems, environments, and configurations that may be suitable for use with the present technology include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Overview

A database management system (DBMS) generally comprises one or more servers for querying a database for a specific record and returning that record to a user. A server may comprise a physical computing system that runs server software, and these servers may experience performance and recovery problems, as well as security threats, as a result of a faulty configuration or maintenance of the server.

Various embodiments of the present technology address these concerns by providing a means of conducting a DBMS risk assessment analysis of a DBMS. For instance, the DBMS risk assessment analysis could be configured to identify problem areas with an implementation of a server associated with a DBMS, and to provide recommendations for remedying such problems. To illustrate, an operator of a DBMS might realize that a server associated with the DBMS is running slower than usual, and request a consultation from a DBMS risk assessment consultant. Upon receiving the consultation request, the consultant would arrive on site to physically inspect the server, and run a DBMS tool set configured to collect a set of data associated with the server, such as operational or counter data.

The collected data would then be analyzed and a DBMS risk assessment report would be compiled that identifies one or more problems associated with the operator's DBMS. For instance, the report might identify possible areas where, either because of how the DBMS is configured or because of the manner in which the DBMS is being run or maintained, an operation of the DBMS may experience problems in the future.

Next, the DBMS risk assessment consultant could deliver the DBMS risk assessment report, or a copy thereof, to the operator, and could even discuss the findings of the report with the operator. For instance, the consultant and the operator might schedule a meeting during which the consultant will advise the operator as to one or more actual or potential issues and problems associated with the assessed DBMS which have been included in the report, and suggest courses of action for remedying such problems and avoiding their occurrence in the future. It should be understood, though, that a suggested solution may include having someone come back on site, or otherwise working remotely, to further investigate the particular problem in order to develop another solution that encompasses a more long-term remedy.

In addition, the consultant could spend some additional time with the operator in order to share additional knowledge relating to DBMSs. Indeed, upon reviewing the DBMS risk assessment report, the operator might have questions relating to issues that he or she would like to discuss in greater detail with the consultant, or the operator may want to learn how consultants factor and analyze the information acquired from the DBMS so as to identify potential problems so that the consultant can continue to monitor the DBMS after the consultant leaves.

Thus, various principles of the present technology provide a method and system for conducting a risk assessment analysis of a DBMS by analyzing a set of data obtained from a server associated with the DBMS, and then generating a DBMS risk assessment report that may be used to advise an operator of the DBMS about one or more problems associated with a present implementation or configuration of the DBMS. However, it should be understood that various methods exist for obtaining data from the DBMS that may be used in the DBMS risk assessment process. For instance, various embodiments of the present technology teach manually collecting a set of data from the DBMS, such as cluster information that may be used in a subsequent risk assessment analysis.

Other embodiments of the present technology teach a scripting module that generates a script that is configured to collect information associated with a DBMS when ran on a server associated with the DBMS. The module will load the output of this script into a server database, and this data may then be selected to generate a preliminary or final DBMS risk assessment report.

Various alternative embodiments teach obtaining counter data from a server associated with a DBMS by means of a counter data collection module. This module would then load the counter data into the server database. However, it should be appreciated by those skilled in the art that the script that is generated by the scripting module may also be configured to collect counter data associated with the assessed DBMS.

Various other embodiments of the present technology utilize an event analysis module to filter events from an event log associated with one or more operations of a server associated with a DBMS, and producing a document of events that transpired within a specific period of time. Indeed, the document of events could further include one or more predefined recommendations that match the identified events. The information compiled in the document could also be stored in a server database, where it may be subsequently accessed during an information gathering process utilized to compile a preliminary or final DBMS risk assessment report.

Finally, various embodiments of the present technology teach the implementation of an issue identification module that analyzes a preliminary DBMS risk assessment report comprising one or more issues associated with an implementation of a DBMS, locates one or more flagged issues within the preliminary report, and generates a final DBMS risk assessment report that includes these flagged issues.

A final DBMS risk assessment report may disclose issues of possible interest, issues relating to a present problem that is currently afflicting the DBMS, or that may afflict the DBMS if some action is not taken, suggestions regarding how to fix an identified problem or issue, as well as preventative maintenance steps that an operator can take to help the DBMS to avoid certain problems in the future. Such comprehensive information is obtained by comparing issues associated with the assessed DBMS to a group of predefined issues associated with one or more other DBMSs.

Thus, it should be appreciated by those skilled in the art that principles of the present technology offer a novel means of proactive engagement that focuses on commonly occurring root causes to problems that afflict DBMSs in general. In other words, problems associated with various implementation of DBMSs often result from the same types of root causes. Thus, by analyzing a past problem associated with another DBMS, the risk assessment may be streamlined to more quickly identify a problem, and one or more solutions thereto, associated with a different DBMS that is currently being analyzed.

Indeed, implementations of the present technology may be utilized by developers, manufactures or vendors of various types of servers, as well as application or operational software or hardware associated therewith, to alleviate the number of customer satisfaction issues that revolve around a relatively small number of specific problems associated with a product. For instance, various embodiments of the present technology may be employed to cut down on the customer satisfaction issues relating to performance problems, unexpected downtimes or recovery problems, as well as security issues associated with an active server or server cluster. In fact, it should be appreciated from a business perspective that the provision of preventive maintenance information to a customer may have the practical effect of lowering the number of instances that a manufacturer or vendor will be called upon to take care of a customer satisfaction issue, since such an issue will not have developed in the first place.

Moreover, various embodiments of the present technology are described in the context of risk assessment of a SQL server or SQL server cluster. However, it is appreciated that embodiments of the present technology are also well suited to be used for analyzing and evaluating an implementation of a computer language other than SQL.

Furthermore, the present technology is useful for evaluating an implementation of a computing system in general, and could even be used for obtaining information from a non-computing environment and evaluating that information with respect to data associated with other similar environments. The embodiments described below are in the context of DBMS risk assessment for purposes of illustration and are not intended to limit the scope of the technology.

Architecture

A DBMS is generally configured to utilize one or more servers to query an information database for specific data requested from a client. It is understood that the term "server" may be broadly defined to include any type of tool that may be used to query a database for information. For instance, the term "server" can be used to refer to a server application or application program configured to receive service requests and generate responses to such requests. In addition, the term may refer to a computer system that has been designated for running one or more specific server applications.

Moreover, a computer that is designated for a specific type of server application is often named for that application. For example, a computer that utilizes SQL to query a database for information is often referred to as a "SQL server". However, it is understood that the term "server" may also refer to a server application running on a tangible computing system rather than the combination of the computing hardware and one or more software modules that are run on such hardware.

Various configurations for implementing a server application exist. For instance, a server application could reside within the same computing system as a client application that is utilizing the server application, and the computing system could be used to run both applications. In one embodiment of the present technology, both the client application and server application are software modules stored in a single storage unit (e.g., a magnetic hard disk drive), and these software modules are run by a single logic or processing unit, such as a microprocessor, within the computing system. In an alternative embodiment, the client application is stored in a different storage unit than the server application, yet the same microprocessor within the computing system is able to access and run both applications.

However, it should be understood that the server application and the client application can reside within different computing systems, and the applications can communicate through a communication network. As an example, two computers could be coupled with a local area network and configured to communicate with one another. For instance, the computers could be configured to communicate by means of RS232, RS485, firewire, USB or fiber optic communication protocols. The client application would run on one computer and the server application would run on the second computer, and the applications would be configured to communicate with one another such that the client application generates and sends a request to the server application, over the communication network, and the server application generates and sends a response to the received request.

Alternatively, the server application and the client application could reside within different computing systems and communicate through a wide area network, such as the Internet. Indeed, a plurality of servers could be utilized over a relatively large geographic area to provide data to a client. For instance, an HTTP server could be utilized to transmit a request to a SQL server that obtains stored data from a database. The SQL server would then transmit the generated response to the HTTP server, which would forward the response to the client.

In another embodiment of the present technology, multiple server applications are divided among multiple server computers, depending upon a current relative workload. For instance, every server application could run concurrently on a single computer when a server workload is relatively light. When a medium workload is realized, a single server computer could be utilized for each server application, which would help to minimize the amount of damage caused by a failure of any single server computer or a security breach of any single server application. Finally, when a heavy workload is experienced, multiple server computers could be utilized for each application, such that the processing burden is shared among multiple processing units.

Figure 2:
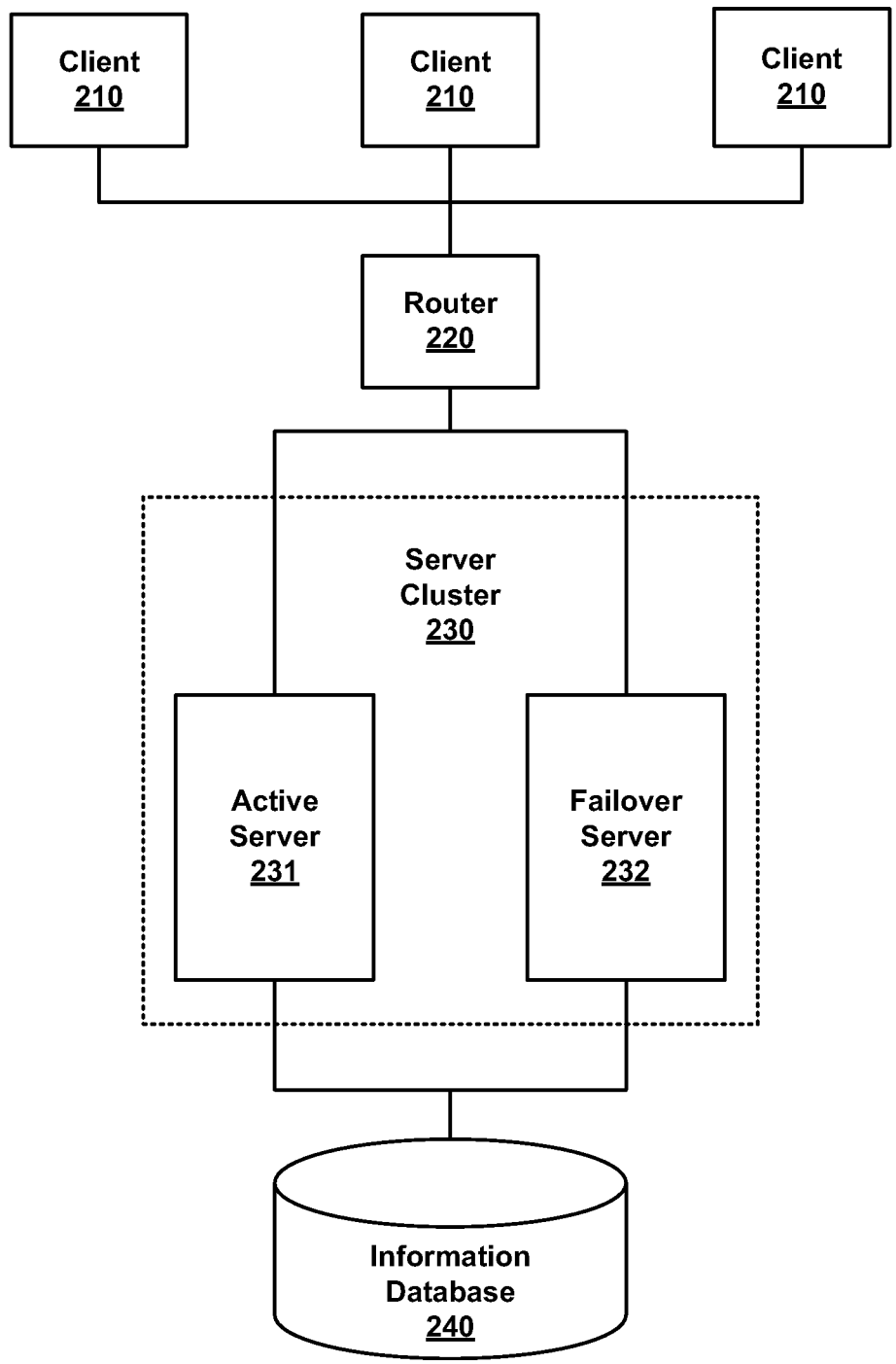
FIG. 2 is a block diagram of a first exemplary network environment used in accordance with an embodiment of the present technology for enabling a server to query an information database.

With reference now to FIG. 2, an exemplary network environment 200 for enabling a server to query an information database according to an embodiment of the present technology is shown. Clients 210 generate requests for information, where such requested information is located in an information database 240. The clients 210 are coupled with a router 220 that is configured to route information between the clients 210 and a server cluster 230.

In one embodiment, the router 220 is configured to route a request from a specific client 210 to a specific server in the server cluster 230. Once the specified server has obtained the requested data from the information database 240, the specified server sends the requested data to the router 220, which then routes the data to the specific client 210 that originally requested the information. In this way, the network environment 200 is configured such that a request is not routed to an inactive server within the server cluster 230, and such that the requested data is not returned to a client 210 that did not request the data.

Although the embodiment illustrated in FIG. 2 demonstrates a network environment 200 that utilizes a router 220 to route data between the clients 210 and the server cluster 230, it should be understood by those skilled in the art that the router 220 may be broadly defined as any transmission medium through which data may be transmitted. For instance, in one embodiment, the router 220 is simply a transmission line that couples a client 210 with a server within the server cluster 230. In another embodiment, the router 220 is a wireless transmitter or transceiver configured to transmit an electromagnetic representation of the requested data between a client 210 and a server within the cluster 230.

In an alternative embodiment of the present technology, the network environment 200 is a single computing system that comprises a client application and a server configured to query a database of information, and the router 220 is simply a physical component or software module, or portion thereof, that is used to route data between the client application and the server application. For instance, a client application and an active server application could exist as software modules running on the same computer. The client application would generate a request for information from the information database 240, and the server application would then be run in order to obtain the requested information from the database 240.

In a related embodiment, the router 220 is simply a specific portion of random access memory (RAM) or an array of shift registers used to temporarily store data being transferred by a computing system between the client application and the server application. Indeed, the router 220 could simply be electrically conductive leads coupled with a motherboard component of the computing system, wherein such electrically conductive leads are configured to transmit data between the client and server applications of the network environment 200.

With reference still to FIG. 2, the server cluster 230 includes at least one active server 231 and at least one failover server 232. The active server 231 is configured to query the information database 240 for requested data. The failover server 232 acts as a backup server in the event that a problem arises with the active server 231. Thus, the server cluster 230 may be comprised of two or more servers that are linked together in such a way that if one were to fail, then all of the applications that had previously been running on the failed server will automatically start running on another server within the cluster 230. In this way, the server cluster 230 is configured such that at least one server within the server is available to query the information database 240 and return a result to the specific client 210 that generated the request.

However, it should be appreciated that although certain embodiments are described as utilizing or being implemented in conjunction with a server cluster 230, such a cluster 230 is not required to practice the present technology. Indeed, in one embodiment, it is sufficient that a single server exists such that the server may be analyzed for DBMS risk assessment purposes.

Figure 3:
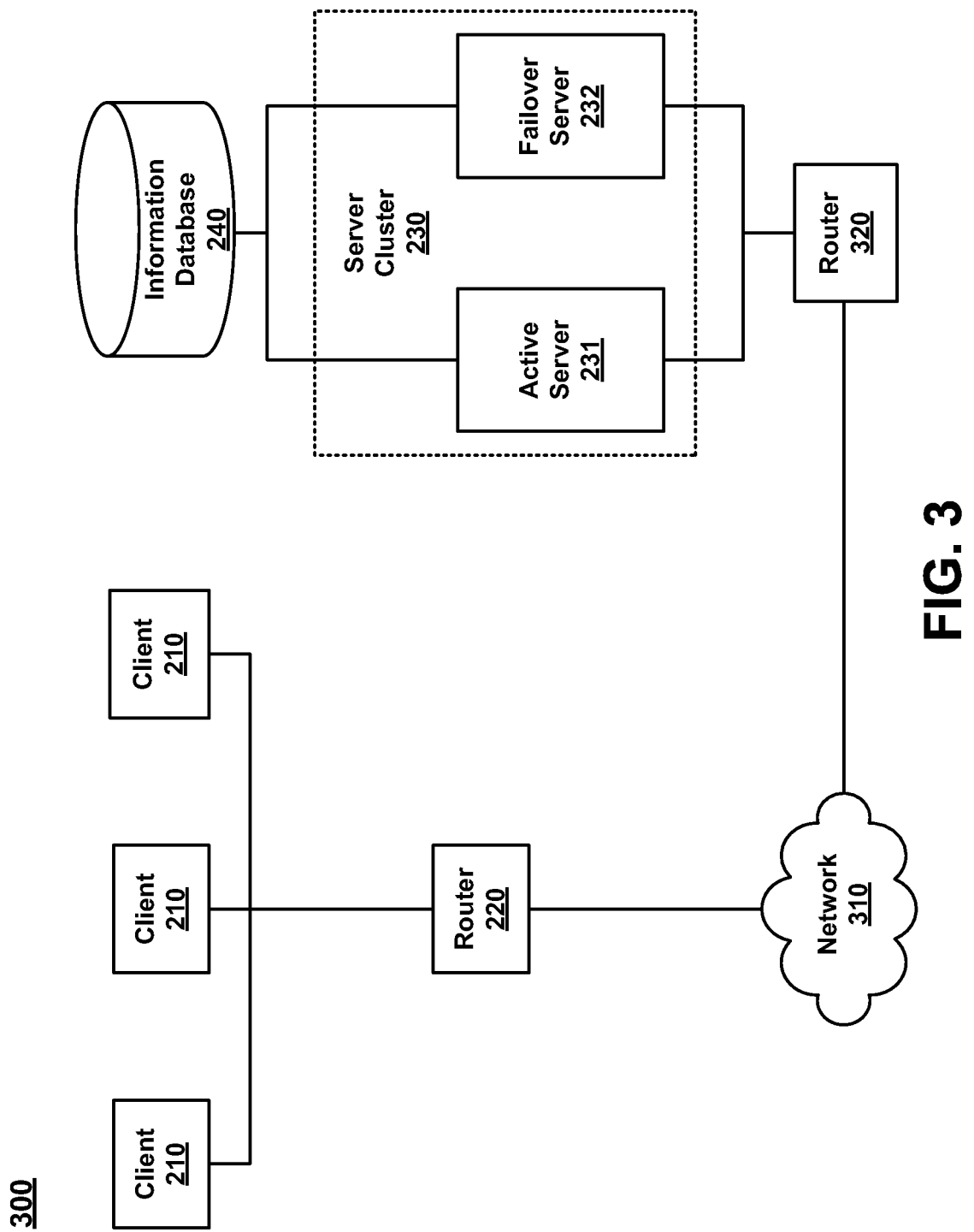
FIG. 3 is a block diagram of a second exemplary network environment used in accordance with an embodiment of the present technology for enabling a server to query an information database.

With reference now to FIG. 3, another exemplary network environment 300 for enabling a server to query an information database according to an alternative embodiment of the present technology is shown. A first router 220 routes a request from a client 210 to a second router 320 through a communication network 310. The second router 320 then routes the request to an active server 231 within a server cluster 230, and the active server 231 queries an information database 240 for information requested by the client 210 in the obtained request. The server cluster 230 further comprises at least one failover server 232 that acts as a backup server in the event that the active server 231 fails.

In one embodiment of the present technology, the clients 210 may physically exist at a remote location with respect to the active server 231, and the communication network 310 is a wide area network such as the Internet. In another embodiment, the first and second routers are HTTP compliant routers or servers configured to exchange information over a wide area network. Thus, the clients 210 and the active server 231 can communicate data over a large geographic area utilizing the communication network 310, which has the practical application of allowing a larger number of clients 210 to communicate with the server cluster 230.

Data Acquisition

Figure 4:
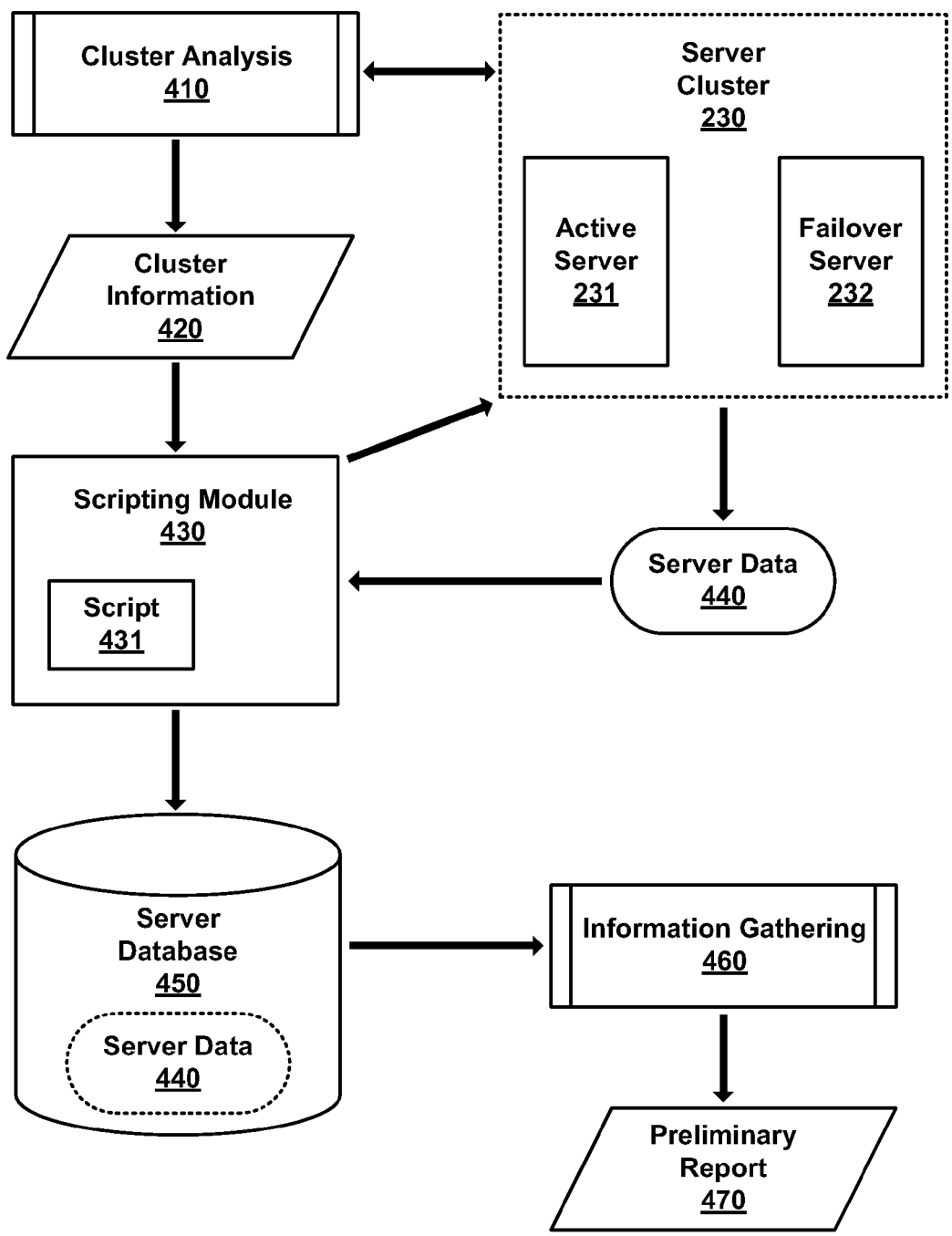
FIG. 4 is a block diagram of an exemplary data acquisition system in accordance with an embodiment of the present technology for acquiring server data associated with a DBMS.

With reference now to FIG. 4, a data acquisition system 400 for acquiring server data associated with a DBMS in accordance with an embodiment of the present technology is shown. The system 400 utilizes an initial cluster analysis 410 used to obtain cluster information 420 relating to a DBMS. For instance, the cluster analysis 410 could be implemented to analyze an active server 231 and determine whether such server 231 is part of a larger cluster of servers, such as a cluster 230 comprising the active server 231 as well as a failover server 232.

The data acquisition system 400 also implements a scripting module 430 to obtain other server data 440 associated with the DBMS, such as the active server 231. Upon being obtained, the server data 440 is stored in a server database 450. The data acquisition system 400 further utilizes an information gathering process 460 to generate a preliminary report 470 that details information associated with the active server 231 and an associated server cluster 230, if one exists.

The cluster analysis 410 obtains cluster information 420 that communicates whether the active server 231 is part of a server cluster 230. The cluster information 420 may further include the number of nodes within an identified cluster 230, and how the "heartbeats" of the individual nodes are interconnected. For instance, a server cluster 230 may include two servers, the heartbeats of each being connected by means of a transmission line such as a cable. In this manner, if one server fails, the other server will sense, through the cable, a failed heartbeat associated with the failed server. The other server will then begin to run applications that the failed server had previously been running. In another embodiment, the cable is also used to transmit data such as applications that the failed server had previously been running, to another server in the cluster. Thus, the servers and the cable may be configured such that the cable serves a dual purpose: sensing a failed heartbeat and transmitting application data to a failover server.

It should be understood, however, that the term "heartbeat" has not been specifically defined so as not to unnecessarily limit the scope of various embodiments of the present technology. Indeed, the term could be broadly defined to include any type of system pulse, communication or attribute that is capable of being detected for the purpose of determining that a server within a server cluster has failed. For example, the active server 231 could be configured to generate an electronic signal that reflects whether the server 231 is currently operating efficiently or has otherwise failed. The failover server 232 could then be configured to detect the electronic signal such that the failover server 232 will take over an operation when the active server 231 enters into a failed state.

It should also be appreciated by those skilled in the art that the attainment of such cluster information 420 may be fairly useful to an analysis of an implementation of an active server 231. For instance, if the connection between two servers within a server cluster is not configured properly, a failover server may not realize that a previously active server has failed. This in turn could lead to situations where the applications completely fail, or fail more frequently than they otherwise would have. Indeed, the failure of a failover server to detect the failure of an active server may cause the entire server cluster to fail if another failover server in the cluster does not detect another server's failure.

It should be further appreciated by those skilled in the art that different methods exist for obtaining such cluster information 420. For instance, a software module, such as an event driven script, could be configured to analyze an active server 231 to determine whether it is part of a cluster 230. Specifically, the module could check to determine whether the heartbeat of the active server 231 is currently being monitored by at least one failover server 232. If such monitoring is taking place, the module could generate an output communicating that the active server 231 is part of a server cluster 230. This output could then be transmitted to the scripting module which could utilize the acquired cluster information 420 to efficiently obtain other server data 440.

The foregoing notwithstanding, it should be understood that the use of a software module is not always practical to collect such cluster information 420. Oftentimes, it is not easy to implement a script for this purpose. Therefore, in another embodiment of the present technology, cluster information 420 is obtained manually. For instance, a person skilled in the art could physically arrive at the active server 231 and proceed to manually collect information of interest, such as information associated with the server cluster 230. Such an implementation of the present technology has practical applications for DBMS risk assessment consultation services in which a consultant physically arrives at the site of a customer's active server 231 and manually determines whether the active server 231 is part of a larger cluster 230 of servers.

In one embodiment of the present technology, a cluster administrator tool associated with the active server 231 can be manually accessed, and data accessed through the administrator tool set can be analyzed to obtain the cluster information 420. In the case of a heartbeat connection existing between the active server 231 and a failover server 232, the server cluster 230 might also have a network tool that can be manually accessed to analyze the properties of a heartbeat.

Therefore, it should be understood by those skilled in the art that various tool sets and processes may be utilized to obtain cluster information 420 associated with an active server 231. For instance, it should be further understood that such cluster information 420 may be obtained by implementing a software module configured to collect the cluster information 420. Indeed, the cluster information 420 may even be obtained by collecting a first set of information manually and implementing a software module configured to collect a second set of information.

As an example of such a software module, an embodiment of the present technology utilizes a software module configured to analyze the T-nodes of a server cluster. Specifically, the module would be used to make sure that the same version of drivers, hotfixes or service packs are used on all nodes of the cluster. Since this tool is used to verify that multiple servers within a cluster are using the same software for specific applications, in one embodiment of the present technology, this software module is only run when such a cluster exists. For instance, the cluster analysis 410 could determine whether the active server 231 is part of a server cluster 230, and if the cluster 230 exists, the data acquisition system 400 would initiate an instance of the aforementioned software module to check which versions of software are being run by one or more servers within the cluster 230.

Thus, it should be appreciated that the present technology may be implemented in various fashions so as to provide a great deal of flexibility during the data acquisition process.

Data Structure and Index Analysis

Oftentimes, information is stored in a database in one or more tables of data, and each table contains multiple records of information. In this manner, information in the database is not only stored, but also logically organized so as to aid in the subsequent retrieval of specific information from the database. For instance, a table could be utilized by an employer to store information pertaining to a number of employees associated with the employer, and the table could contain a plurality of records, wherein each record contains information relating to a specific employee. Thus, the database could be queried so as to obtain information relating to, for example, a single, specific employee, or information relating to multiple employees of interest.

A relational database is a type of database that comprises multiple tables of data that are inter-related. Data searches may be conducted, for instance, by referencing data in one or more specified columns of one table in order to locate additional data in another table. In addition, data from a field of a first table may be matched to information in a corresponding field of a second table in order to produce a third table that combines requested information from the first and second tables. Furthermore, a relational database management system (RDBMS) may be employed to manage requests for information that is stored in a relational database, and the RDBMS may utilize a querying paradigm, such as SQL, to retrieve and update data stored in the database.

DBMSs often utilize indexes to locate data in existing tables more quickly and efficiently. Effective indexing is a very useful way to improve performance in a database application. For example, an index could be created that identifies one or more columns of data in a table, and this index would have a name or identifier that is known to a DBMS. Without such an index, a server associated with the DBMS would have to execute a table scan in which the server examines every row in the table in order to satisfy the query results. Thus, indexes are often used to avoid unnecessary table scans because such scans might have a significant impact on system performance, particularly when scanning relatively large, comprehensive tables of information.

Indexes used by DBMSs are either clustered or non-clustered. A non-clustered index is an index that is stored in a different location than the indexed data, and the non-clustered index uses pointers to locate the physical storage location of the indexed data. A server associated with the DBMS can search for a requested data value by searching a non-clustered index to find the location of the data value in a table, and the server will then retrieve the data directly from that location.

In contrast, a clustered index determines the physical order of data in a table and sorts the data according to this order. Thus, a clustered index could be considered somewhat analogous to a telephone directory that arranges information according to surnames. Clustered indexes are particularly effective for searching columns of data for ranges of values. This is due to the fact that after a row with a first data value is located using a clustered index, other rows with subsequent indexed values may be found at physically adjacent locations. Thus, various ways exist in which data can be stored and indexed in a database, as well as various methods of querying such a database in order to retrieve the stored data.

SQL comprises a set of statements that are used to retrieve and update data stored in a comprehensive database of information, such as information database 240. Thus, with reference to the previous example, one or more SQL statements could be utilized by an active server 231 to organize the aforementioned employee records and output each record as a distinct row of related data. Each row of data could be further organized into multiple columns of information, wherein each column of information pertains to a specific subject area. For instance, the rows of organized data could be organized into attributes associated with each employee, such as an employee's first name, last name, age, address, ranking, etc. Indeed, a SQL statement could even be utilized to pinpoint a specific attribute within a table of information in a database, wherein the attribute is associated with a specified employee. This information could then be provided to a user.

Thus, SQL is a powerful tool for querying a comprehensive database of information, such as a relational database, for requested data. Indeed, one or more SQL servers may be utilized as a DBMS. Therefore, it is understood that various embodiments of the present invention may be implemented to conduct a risk assessment of an implementation of a SQL server.

In one embodiment, a configuration of a SQL server or SQL server cluster is analyzed, and a DBMS risk assessment report is generated that identifies one or more problems with the server or cluster configuration. During this analysis, data associated with one or more SQL servers is acquired and reviewed. It is understood, however, that various methods exist for collecting such information.

With reference still to FIG. 4, a scripting module 430 is utilized to obtain server data 440 associated with the active server 231. In one embodiment of the present technology, the scripting module 430 generates a script 431 that is configured to analyze the active server 231. Specifically, the script 431 is transmitted to the active server 231 where the script 431 is run. The script 431 then obtains the server data 440, such as performance data associated with an operation of the active server 231, and returns this data 440 to the scripting module 430. In the event that the active server 231 is part of a server cluster 230, the script 431 may also analyze the failover server 232 such that the acquired server data 440 also comprises information associated with the failover server 232.

In another embodiment, the script 431 generated by the scripting module 430 is a custom script that has been customized according to operating parameters associated with the active server 231. For instance, the script could be configured, either by the scripting module 430 or manually by a user, depending on a current version of an operating system that is being implemented by the active server. The customized tailoring of the script 431 based on operating parameters of the active server 231 would allow the script 431 to more effectively collect information associated with an implementation of that server 231, as well as other servers in the cluster 230, such as the failover server 232, that communicate with the active server.

In an alternative embodiment, the script 431 is manually configurable. That is, a user would manually configure the script 431 to collect information from the server cluster 230 based on a configuration of one or more servers within the cluster 230. For example, the script 431 could be configured according to whether a user wants to include index analysis information in a final DBMS risk assessment report. The script 431 would then acquire the applicable index analysis information and generate an output comprising the obtained server data 440.

With reference still to FIG. 4, the server data 440 is output to the scripting module 430, which receives the data 440 and forwards it to a server database 450. The server data 440 is then stored in the server database 450 where it may be subsequently accessed and obtained by a user. It should be understood by those skilled in the art, however, that other methods exist for transmitting the server data 440 to the server database. For instance, the script 431 could be configured to generate an output comprising the acquired server data 440, and then transmit this data 440 to the server database 450 without the aid of the scripting module 430.

In another embodiment, the server data comprises index analysis information associated with one or more servers within a server cluster 230. For instance, the script 431 could be used to determine if a table exists that does not have an index associated with it. The output of the script 431 could subsequently be analyzed to determine if the absence of an associated index is degrading server performance, since many DBMSs rely on indexes to perform properly and efficiently.

In an alternative embodiment, the script 431 will check the specific type of index associated with a table. For instance, one or more tables could be implemented that are each capable of containing only a single clustered index. The script 431 could then be implemented to determine whether two or more clustered indexes are associated with any such table. In another embodiment, the script 431 will check to determine whether a table is associated with at least one clustered index.

In a further embodiment of the present technology, the script 431 is configured to identify those tables that have duplicate indexes. For example, a table with seven columns might have eight indexes such that the table is utilizing two separate indexes for the same column of information within the table. In this case, an unnecessary index would exist that could hinder system performance.

Hence, the scripting module 430 is utilized by the data acquisition system 400 to acquire certain server data 440 associated with an active server 231, and can even be used to acquire information associated with one or more other servers associated with the active server 231, such as failover server 232. However, it should be understood that use of the scripting module is not the only way of obtaining data associated with a server according to principles of the present technology. For example, other publicly available tools could be implemented to obtain data associated with a DBMS.

In one embodiment of the present technology, a software module could be implemented to generate a script that reports on "blocking" that is occurring on the active server 231. Blocking can occur when a first connection to a server locks one or more records, and a second connection to the server requires access to the record or records locked by the first connection. As a result, the second connection waits until the first connection releases its locks and, by default, will wait an unlimited amount of time for the blocking lock to be lifted. Although a certain amount of blocking may be unavoidable during normal server operation, extensive blocking can cause one or more connections to wait extensive periods of time, which may degrade overall system performance. Thus, the aforementioned software module could be used to report on the amount of blocking that is affecting the active server 231 so that this blocking can be subsequently analyzed and remedied.

With reference still to FIG. 4, after the server data 440 is stored in the server database 450, the data acquisition system 400 utilizes an information gathering process 460 to generate a preliminary report 470 that details information associated with the active server 231 and an associated server cluster 230, if one exists. This information gathering process 460 may be a manual process, or an automated process. In one embodiment, the process 460 involves the implementation of an electronic form generator or information gathering program configured to acquire information related to the active server 231 and generate a preliminary report 470 detailing such information.

In another embodiment, the information gathering process 460 involves an analysis of the acquired server data 440 in order to identify problems and shortcomings associated with the servers of the cluster 230. These problems and shortcomings are then identified in the preliminary report 470. For example, active server 231 might be running an operating system or other software application that uses a specific service pack that is outdated (i.e., a newer service pack is currently available that may be run on the server). In this case, the active server 231 may need to be updated or configured to run the newer service pack. Therefore, it may be determined through the information gathering process 460 that newer software needs to be installed and run on a specific server within the server cluster 230.

As a second example, the information gathering process 460 analyzes performance data obtained from the server cluster 230, and determines a page-life-expectancy of the active server 231. A page-life-expectancy is often associated with information communicating how long one might expect a page of data to reside in system memory under certain conditions. In order to operate efficiently, a server generally needs to operate at a certain page-life-expectancy threshold. If such a threshold is not achieved, there is oftentimes not enough memory available to the server for it to carry out its tasks. Therefore, in one embodiment, the information gathering process 460 is configured to determine that a page-life-expectancy of the active server 231 is below a certain threshold. For instance, if a page-life-expectancy of the active server 231 is around 100 seconds, whereas this attribute should be around 300 seconds in order for the server 231 to be operating efficiently, the information gathering process 460 could be implemented to detect that the 300 second threshold has not been obtained, and then put this information into the preliminary report 470.

Finally, as a third example, the information gathering process 460 could be used to determine if a server within the server cluster 230 is experiencing an unacceptable degree of blocking. For instance, it might be determined that a specific amount of blocking is taking place on the active server 231, and that the blocking is resulting from a query that is taking 20 minutes to run. The information relating to the problem query and the degree of blocking associated therewith could then be put into the preliminary report.

Indeed, it should be appreciated by those skilled in the art that such blocking information could even be analyzed in order to tune a configuration of the active server 231, or otherwise improve its operating efficiency. In one embodiment, the active server 231 is analyzed to determine if it is using the correct indexes. If not, the implemented indexes are changed in order to alleviate or eliminate the degree of blocking experienced by the active server 231 such that the speed and accuracy associated with the execution of a query are increased.

In another embodiment of the present technology, a preliminary report 470 is generated that includes a comprehensive list of information associated with the one or more servers within the server cluster 230. Issues and other areas of interest associated with a server within the server cluster 230 are identified among the list of information such that these issues can be later analyzed. For instance, an identified issue may include a problem that the active server 231 is currently facing, or a potential problem that may negatively affect an operation of the active server 231 if action is not taken to remedy the potential problem.

A problem area associated with an identified issue may be the result of, for example, an improper configuration of the active server 231 that negatively impacts the operation of the active server 231. In addition, such a problem may also be the result of improper maintenance of the active server 231. Therefore, it should be appreciated by those skilled in the art that the preliminary report 470 may be subsequently analyzed to determine which problems are associated with a server in the server cluster 230, and to further determine the root causes of those problems.

In order to aid in a subsequent analysis of the preliminary report, an embodiment of the present technology includes highlighting the identified issues such that problems associated with a server in the server cluster 230 are easier to recognize. For instance, the preliminary report could comprise a list or database of issues configured to be output to a user through a graphical user interface. The identified issues that are associated with problem areas or other areas of interest are highlighted in red such that these issues stand out from the other information in the preliminary report 470. In an alternative embodiment, a similarly efficient identifying technique is used instead of highlighting. For example, a symbolic marker, such as an "X" or a "√", could be located adjacent to an identified issue that is outputted on a graphical user interface, and this symbolic marker would allow a user, or issue spotting application, to quickly identify the identified issue.

Figure 5:
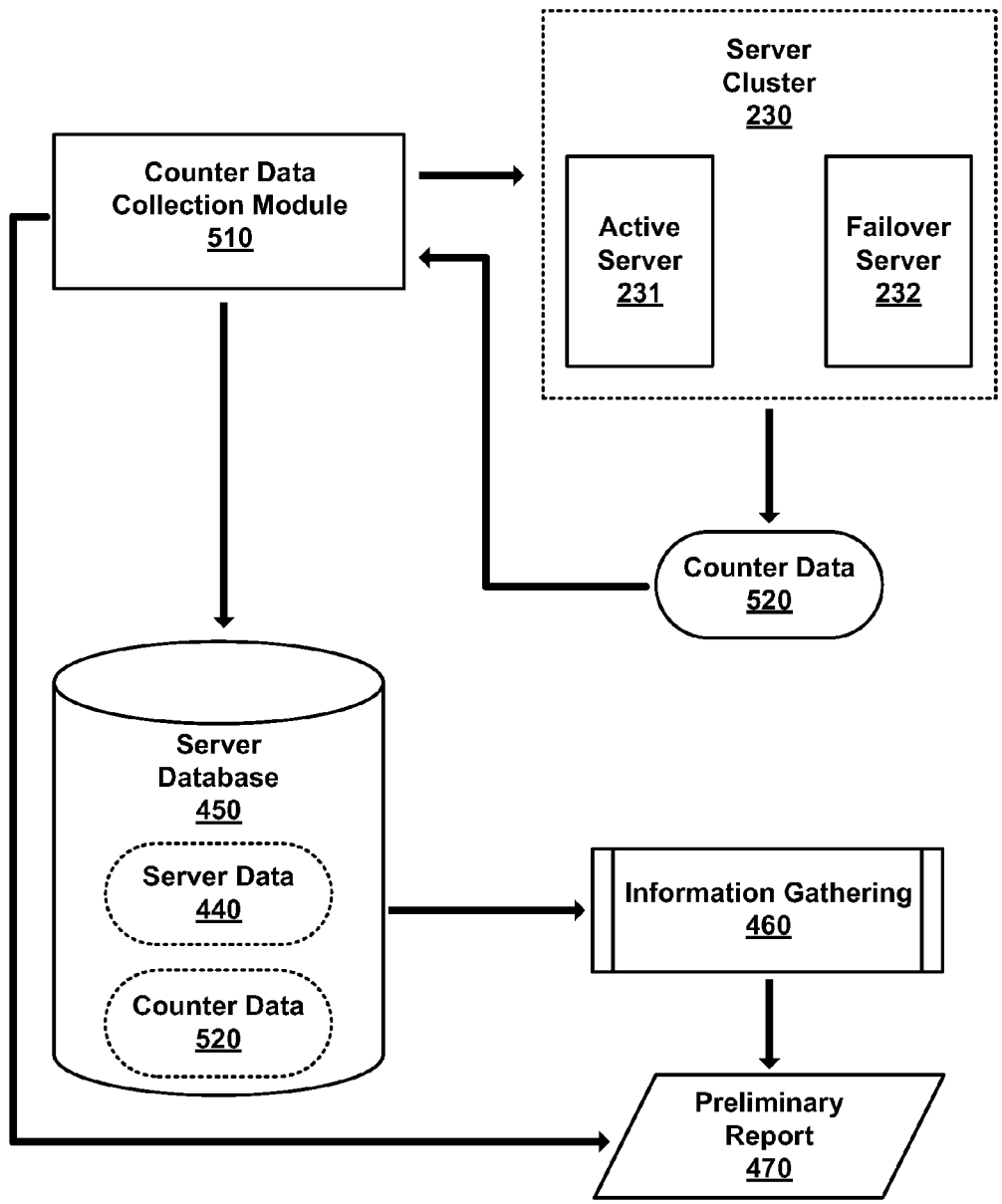
FIG. 5 is a block diagram of an exemplary data acquisition system in accordance with an embodiment of the present technology for obtaining counter data associated with a DBMS.

With reference now to FIG. 5, a data acquisition system 500 for obtaining counter data 520 associated with a DBMS in accordance with an embodiment of the present technology is shown. Specifically, a counter data collection module 510 is used to collect the counter data 520 from the server cluster 230. For instance, the counter data collection module may be configured to allow user-level code to access various performance counters present in certain servers. This may be accomplished by implementing a loadable driver that re-programs devices with performance counters so that user-level code can access these counters, since access to these counters is generally restricted to code running in a privileged mode.

Subsequent to being acquired, the counter data 520 is stored in a server database 450, where it can be accessed during the information gathering process 460 and put into the preliminary report 470. For instance, the counter data collection module 510 may be implemented to collect counter data 520 associated with the active server 231, and then load this counter data 520 into the server database 450. In an alternative embodiment, however, the counter data collection module 510 is configured to add the counter data 520 to the preliminary report 470 without the aid of the information gathering process 460.

Event Analysis

Figure 6:
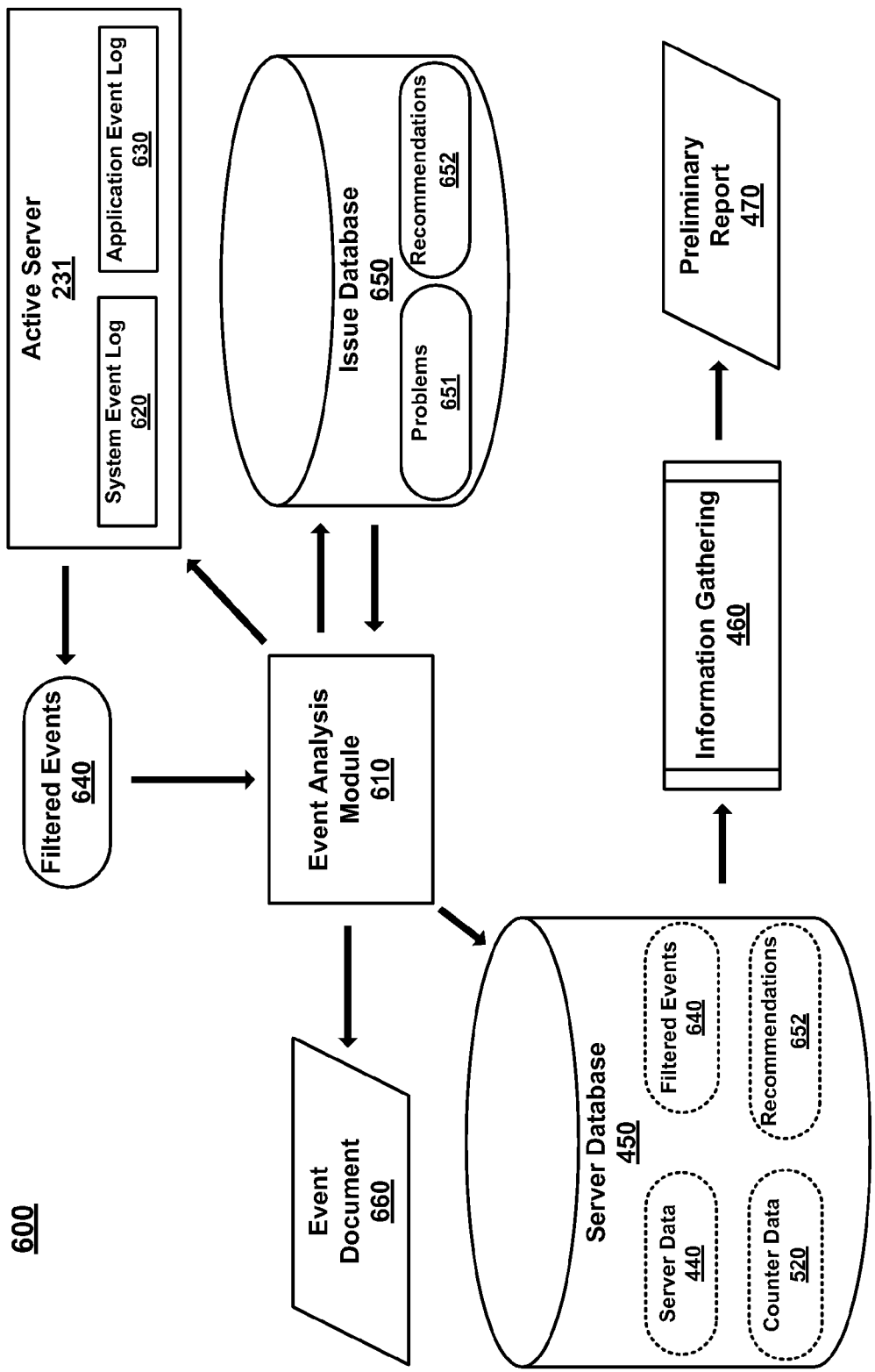
FIG. 6 is a block diagram of an exemplary data acquisition and analysis system in accordance with an embodiment of the present technology for obtaining and analyzing data associated with a DBMS.

With reference now to FIG. 6, a data acquisition and analysis system 600 for obtaining and analyzing server data in accordance with an embodiment of the present technology is shown. An event analysis module 610 is configured to access an event log of a server associated with a DBMS, such as the active server 231. The event log is a listing of events that transpired during an operation of the active server 231. Thus, such an event log may be a fairly useful source of information during the risk assessment process of a DBMS. Such log information may be analyzed and compared to other event procedures and protocols associated with a healthy DBMS in order to pinpoint any problems areas associated with an analyzed operation corresponding to the accessed event log.

In one embodiment, the event analysis module 610 accesses an event log associated with the active server 231, and then filters events from the log that are associated with problems or warnings that transpired during an operation of the active server 231. Thus, it should be appreciated that the event analysis module 610 may be configured to carry out data accessing, acquisition and analysis functions in order to return one or more events from an event log associated with an issue of interest in a DBMS risk assessment of a server.

In another embodiment, the event analysis module 610 accesses a system event log 620 that keeps track of events associated with an operating system, and its various subcomponents, which run on the active server 231. The event analysis module 610 filters events from the system event log 620, wherein the filtered events are associated with errors or warnings that occurred during an operation of the active server 231. Thus, the event analysis module 610 is configured to search for errors and warnings in the system event log 620. Those events that are categorized as simply informational-type events are completely ignored.

In a further embodiment, the event analysis module 610 accesses an application event log 630 associated with applications that have been run within an operating system that runs on the active server 231. The module 610 filters events from the application event log 630 that are associated with an instance of one or more applications that have been run on the active server 231. The events may subsequently be analyzed to determine if one or more of such applications has caused a problem with an operation of the active server 231. Furthermore, in an alternative embodiment, events are filtered from both the system event log 620 and the application event log 630 in order to obtain a more comprehensive system overview of recently occurring events.

In yet another embodiment, the event analysis module 610 is configured to conduct a first filtering process in which events are filtered from the system event log 620 or the application event log 630 if such events are associated with errors or warnings occurring during an operation of the active server 231. In addition, the module 610 is further configured to conduct a second filtering process, during which the filtered events 640 are further filtered according to when such events transpired. For instance, the filtered events 640 could be further filtered pursuant to some predefined period of time.

As an example of this principle, in one embodiment of the present technology, the event analysis module 610 is configured to identify events from the system event log 620 and the application event log 630 that occurred within a previous two week period. In this manner, all events from the group of previously filtered events 640 that occurred within the last two weeks will be returned. This will allow a DBMS risk assessment associated with the active server 231 to concentrate on those problems that have occurred relatively recently, since there is a greater probability that previously occurring problems have already been remedied by a subsequent change in a configuration of the server 231, such as the installation of a newer service pack.

It should be understood by those skilled in the art, however, that the event analysis module 610 may be configured to ignore certain events. For example, the module 610 could be manually configured to ignore events associated with certain sources, such as specific third party applications that are run on the active server 231. Such a configuration might be useful when an instance of the data acquisition and analysis system 600 is implemented such that the focus of its inquiry is on certain applications and operations of interest. For instance, ignoring certain events could have the practical effect of speeding up the data acquisition and analysis process executed by the system 600.

With reference still to FIG. 6, the data acquisition and analysis system 600 further comprises an issue database 650 that includes a plurality of problems 651 and recommendations 652 that have been previously compiled and stored in the issue database 650. Each recommendation from the group of recommendations 652 in the issue database 650 is mapped to at least one problem among the group of problems 651 such that the identification of a problem would yield at least one matching recommendation from among the group of recommendations 652. A matching recommendation includes a recommended course of action that one might take in order to alleviate the negative effects of a corresponding problem associated with the active server 231, or otherwise completely eliminate the problem from the active server 231.

In one embodiment of the present technology, the event analysis module 610 accesses the issue database 650 and compares the errors and warnings associated with the filtered events 640 to the problems 651 in order to identify the nature of the errors and warnings. In other words, the filtered events 640 are compared to a database 650 of preexisting knowledge in order to learn more about what specific afflictions might be inhibiting the performance of the active server 231. Once a problem is determined to be associated with one of the filtered events 640, a recommendation is identified as corresponding to that problem. Thus, the event analysis module 610 may be configured to return not only filtered events 640 associated with errors and warnings experienced during an operation of the active server 231, but possible solutions to such impedances as well.

Once the event analysis module 610 has completed its issue analysis, the module 610 generates an event document 660 that details the filtered events 640 that were identified. In one embodiment, the event document 660 also comprises one or more matching recommendations that were identified from the recommendations 652 stored in the issue database 650. This event document 660 may then be subsequently analyzed such that the filtered events 640, along with one or more possible solutions, may be easily located and considered.

In an alternative embodiment, the filtered events 640 and identified recommendations 652 are stored in the server database 450. This information may then be accessed and analyzed during the information gathering process 460. If it is determined that one of the filtered events 640 merits further attention, the information gathering process 460 will add the event to the preliminary report 470, along with any matching recommendations from among the stored recommendations 652.

For instance, the data acquisition and analysis system 600 may be configured such that only those events of great importance will be included in the preliminary report 470, such that the risk assessment of the active server 231 is streamlined so as to focus only on those issues that pose a relatively significant threat to the performance and continued vitality of the active server 231. Thus, the information gathering process 460 could include a means for categorizing the filtered events 640 according to an order of importance based on some ranking criteria, and only add those events to the preliminary report 470 that are categorized as being, for example, a severe threat to the active server 231 rather than merely a mild threat. It should be understood by those skilled in the art that such a threat analysis could use as its basis an analysis of the potential damage to the active server 231 that such a threat might ultimately cause.

Issue Analysis and Identification

Figure 7:
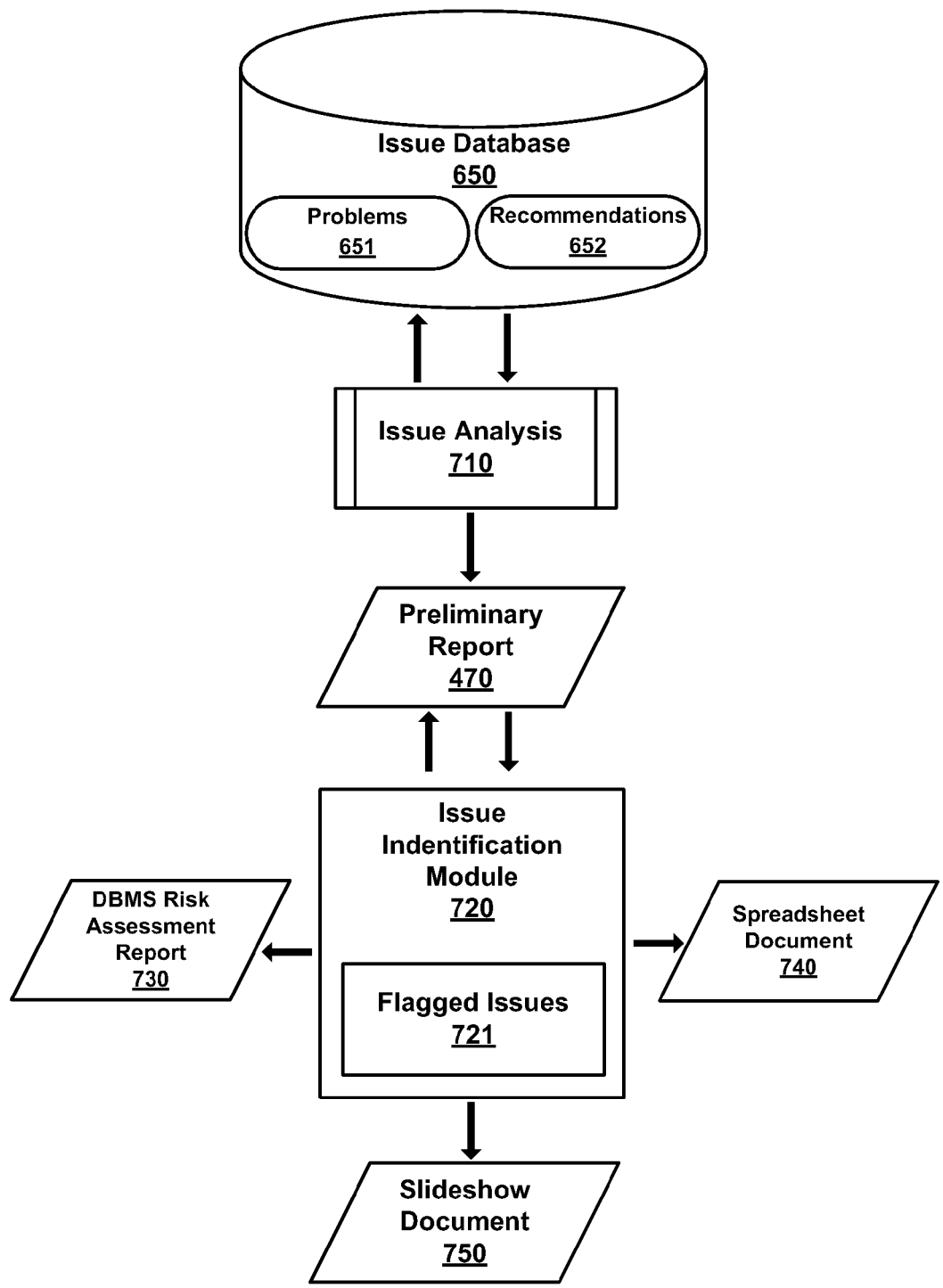
FIG. 7 is a block diagram of an exemplary risk assessment system in accordance with an embodiment of the present technology for generating a DBMS risk assessment report.

With reference now to FIG. 7, a risk assessment system 700 for generating a DBMS risk assessment report in accordance with an embodiment of the present technology is shown. The risk assessment system 700 receives a preliminary report 470 that includes a preliminary list or database of issues associated with a server, which is associated with the DBMS, such as the active server 231. The system 700 utilizes an issue analysis 710 to identify issues in the preliminary report 470 that warrant further attention during the risk assessment process. A preliminary report 470 that includes a list or database of issues associated with a DBMS is analyzed during the issue analysis 710, and specific issues of interest are identified.

In one embodiment, the issue analysis 710 includes accessing an issue database 650 comprising a plurality of problems 651 that have been identified in the past as being associated with one or more other DBMSs. For instance, when a problem with a DBMS is identified, information relating to the problem could be stored into the issue database 650 so that such information associated with the problem may be subsequently analyzed to determine if another DBMS is suffering from the same problem. Thus, the issue analysis 710 would further include comparing an issue from the preliminary report 470 to determine if the issue is related to one of the problems 651 stored in the issue database 650.

In another embodiment, the issue analysis 710 provides feedback regarding the status of issues in the preliminary report 470. For example, if an issue in the preliminary report 470 is determined to be of interest to the DBMS risk assessment, the issue would then be flagged so that the issue may be subsequently identified without needing to perform a secondary issue analysis. Furthermore, if the issue analysis 710 determines that an issue in the preliminary report 470 is related to one of the problems 651 stored in the issue database 650, the issue analysis 710 could flag the issue by formatting the corresponding data in the preliminary report 470 such that the visual display of information pertaining to the issue would be highlighted, such as in a red font. In this manner, a flagged issue would stand out among those issues in the preliminary report 470 that have not been flagged.

It should be understood by those skilled in the art that the issue database 650 does not necessarily need to be a modern electronic or magnetic database, such as a hard disk drive or flash memory that is configured to store digital data for use by an electronic, optic or mechanical computing system. Indeed, the issue database may simply be a list of predefined issues comprising mechanically printed or physically transcribed characters on a printing medium, such as a sheet of paper.

Furthermore, it should be understood that according to one embodiment of the present technology, the issue analysis 710 is a manual process in which a person, such as a DBMS risk assessment consultant, manually compares issues in the preliminary report 470 to a list or group of predefined issues. If information relating to the list or group of predefined issues has been printed or transcribed onto a physical printing medium, the issue analysis 710 could further comprise manually highlighting any issues in the preliminary report 470 that relate to problems associated with one or more other DBMSs.

In another embodiment of the present technology, issue database 650 includes a set of problems 651 and a set of recommendations 652 that correspond to those problems. Each recommendation from the set of recommendations 652 includes at least one possible solution to a problem that corresponds to the recommendation. Further, the issue analysis 710 further includes identifying a problem from the set of problems 651 stored in the issue database 650, where the problem is associated with an issue among the list of predefined issues, and then selecting a recommendation from the set of recommendations 652. The issue analysis 710 then adds the selected recommendation to the preliminary report 470.

In an alternative embodiment, the issue analysis 710 is utilized by the system 700 to create a more comprehensive preliminary report 470. For instance, the issue analysis 710 could be utilized to add an issue description to the preliminary report 470, wherein the issue description provides descriptive information relating to an issue in the report 470. Such a description might be used, for example, to relay information that discloses possible causes of the issue and possible negative attributes associated with the issue.

Indeed, it should be understood that the issue analysis 710 could further comprise providing a link in the preliminary report 470 that identifies other reference information corresponding to an issue from the list or database of issues. For example, system 700 could be configured to identify Internet hyperlinks mapped to specific Web pages that provide additional information relating to issues in the preliminary report. The issue analysis 710 could then be used to add these hyperlinks to the preliminary report such that a user could click on the hyperlinks to obtain more information relating to the identified issues.

In another embodiment, the issue analysis 710 is used to assign a degree of urgency to an issue in the preliminary report 470. For example, the issue analysis 710 could analyze the potential damage to a DBMS that could result from not remedying an identified problem with a server associated with the DBMS. In another example, the system 700 is configured such that both an identified degree of urgency and specific information relating to an identified risk associated with the issue are added to the preliminary report 470 so as to provide a user with more detailed information relating to the issues in the preliminary report such that the user can make a more informed decision regarding which course of action to take.

With reference still to FIG. 7, the risk assessment system 700 further comprises an issue identification module 720 that analyzes the preliminary list or database of issues in the preliminary report 470, and any feedback associated with the preliminary list or database of issues, such as feedback provided by the issue analysis 710. The issue identification module 720 then automatically selects one or more issues from the preliminary report 470 based on the acquired feedback, and generates a DBMS risk assessment report 730 that identifies these selected issues. For instance, the issue identification module 720 could be configured to search the preliminary report for issues that were previously flagged, and then create a set of flagged issues 721 that may be brought to a user's attention. In one embodiment, the issue analysis 710 implements an electronic form generator or information gathering program configured to acquire flagged information from the preliminary report 470 and generate the DBMS risk assessment report 730.

Thus, the issue identification module 720 generates a DBMS risk assessment report 730 that lists or otherwise discloses the flagged issues 721. This report 730 may then be analyzed by an operator of the assessed DBMS to determine what problems have been identified with a server associated with the DBMS, and how the operator might go about solving these problems. For instance, the DBMS risk assessment report 730 might show that the active server 231 has an insufficient amount of random access memory (RAM) to efficiently perform a detailed query of an information database 240.

Furthermore, the DBMS risk assessment report 730 might further detail one or more solutions associated with the set of recommendations 652 from the issue database 650, wherein such solutions are configured to remedy one or more problems identified in the report 730 as being associated with the active server 231. With reference to the previous example, if the DBMS risk assessment report 730 shows that the active server 231 has an insufficient amount of random access memory (RAM), the report 730 might recommend to a user that the active server 231 be provided with a greater amount of random access memory (RAM), or that one or more applications that are run on the server 231 be reconfigured such that they utilize less of the available system memory. In this way, the DBMS risk assessment report 730 would not only disclose a problem associated with a server, and a solution for that problem, but would detail multiple solutions configured to remedy the problem so that a user can choose a specific solution that will best comport with the user's financial, temporal, or technological ability to reconfigure the assessed server.

In another embodiment of the present technology, the issue identification module 720 is configured to present the flagged issues 721 in a format that is capable of being physically viewed. For instance, the DBMS risk assessment report 730 could comprise a word processing document that presents the flagged issues 721 in an organized fashion. Indeed, the module 720 could even be further configured to generate a spreadsheet document 740 that includes data identifying one or more of the flagged issues 721.

In an alternative embodiment, the issue identification module 720 is configured to generate a slideshow document 750 that presents at least one issue associated with the active server 231, and details at least one recommendation for remedying a problem associated with that issue. In this manner, a DBMS risk assessment consultant could utilize the risk assessment system 700 to generate the slideshow document 750 that could be presented to an operator of the active server 231 during a DBMS risk assessment consultation. This would provide the consultant with the opportunity of explaining in great detail an issue associated with the active server 231 while simultaneously being able to refer to a visual aid.

DBMS Risk Assessment Report Generation

Figure 8:
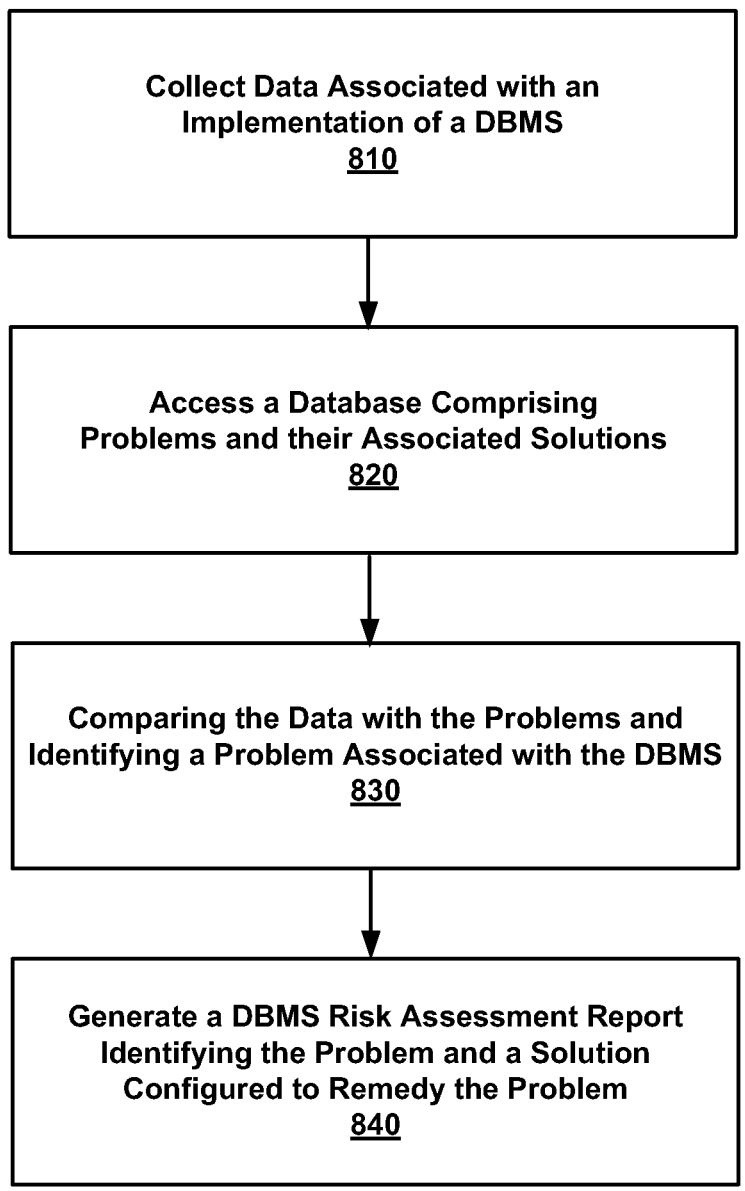
FIG. 8 is a flowchart of an exemplary method for generating a DBMS risk assessment report in accordance with an embodiment of the present technology.

FIG. 8 is a flowchart of an exemplary method 800 for generating a DBMS risk assessment report in accordance with an embodiment of the present technology. The method includes collecting a set of data associated with an implementation of a first DBMS 810. The collected data may consist of, for example, information relating to a server configuration, a database configuration, a security setting or other security-related data, login information, index analysis information, and counter data.

In one embodiment, the set of data is collected by first manually collecting a preliminary set of data from the DBMS. For instance, a user could manually collect a preliminary set of data that includes cluster information associated with a configuration of the DBMS. To illustrate, a DBMS risk assessment consultant could physically arrive at the location of a server associated with the DBMS and analyze the connections to the server to see if it is interlinked with one or more other servers so as to form a component of a server cluster. This preliminary set of data would then be acquired for further analysis of the DBMS.

It should be understood that the method 800 may be expanded to include the implementation of a DBMS tool set that analyzes the preliminary set of data and automatically collects another set of data from the DBMS depending on the substance of the preliminary set of data. In one embodiment of the present technology, a custom script is generated based on the acquired preliminary set of data, and this custom script is then run on a server associated with the DBMS. The custom script is configured to collect a set of data from the server including issues associated with one or more operations of the server.

With reference still to FIG. 8, the method 800 further includes accessing a list or database of issues including a plurality of problems associated with one or more other DBMSs and including a plurality of solutions, wherein each solution from the plurality of solutions is configured to remedy a problem from the plurality of problems 820. The method 800 also includes identifying at least one issue associated with the first DBMS by comparing the collected set of data with the list or database of issues, wherein the identified issue corresponds to at least one problem from the plurality of problems 830. It should be understood that such a problem may be a problem that the DBMS is currently facing, or a potential problem that could negatively affect an operation of the DBMS if action is not taken to remedy that potential problem, or some other type of problem.

In one embodiment of the present technology, a preliminary list or database of issues associated with an implementation of the DBMS is generated based on the collected set of data. Feedback is received that identifies at least one issue from the preliminary list or database of issues based on a problem associated with another DBMS. For instance, another DBMS may be analyzed in order to identify a problem with such DBMS, and the nature of this problem can be added to a list of identified issues with various DBMSs. Thus, when the method 800 is implemented to analyze a specific DBMS, the precompiled list of identified issues may be consulted in order to identify a problem with such DBMS that is already detailed within the list. Such an implementation of the method 800 may help to minimize the temporal duration of the DBMS risk assessment process.

Finally, the method 800 includes generating a DBMS risk assessment report that identifies the issue associated with the first DBMS and a solution from the plurality of solutions that is configured to remedy the problem 840. This DBMS risk assessment report may then be outputted, such as in a human-readable format. For instance, the DBMS risk assessment report could be presented to a person implementing the DBMS, and this person would be able to read or otherwise analyze the report to discover the identified problem, and its corresponding solution. The person would then be in a position to make a more informed decision regarding how to reconfigure an implementation of the DBMS so as to alleviate or eliminate the problem.

In one embodiment of the present technology, the generated DBMS risk assessment report is used to disclose a problem with an event log associated with an operating system that runs on a server associated with the DBMS, and at least one potential solution for remedying such problem. For instance, the method 800 could include accessing an event log and filtering events from the log that comprise errors and warnings that have transpired within a predefined period of time. The method could further include identifying predefined recommendations that match the filtered events, and then disclosing the filtered events and the predefined recommendations in the DBMS risk assessment report.

It should be understood that the method 800 for generating a DBMS risk assessment report may be further expanded so as to provide a more comprehensive risk assessment report of the DBMS. For instance, in one embodiment, the method 800 further includes adding a plurality of links to the list or database of issues, wherein each link from the plurality of links identifies reference information corresponding to an issue from the list or database of issues. In an alternative embodiment, preventative maintenance information is added to the DBMS risk assessment report, the preventative maintenance information helping the person to avoid a problem from the set of identified problems occurring in the DBMS at a subsequent point in time.

It should be further understood that information in the risk assessment report generated by the method 800 may also be organized according to a sorting criteria. For instance, the method 800 could be expanded so as to include sorting a first issue and a second issue from a plurality of identified issues according to a sorting criteria and adding the first and second issues to the DBMS risk assessment report according to the sorted order. In one embodiment, the sorting criteria utilizes a first potential risk associated with the first issue and a second potential risk associated with the second issue. Furthermore, the sorting of the first and second issues includes an assessment of the first and second potential risks to determine which of the first and second issues is more dangerous to an operation of the DBMS. In this manner, the issues may be ordered, for example, according to which issue is potentially more dangerous to the DBMS.

It should be understood that the electronic and software-based systems discussed herein are merely examples of how suitable computing environments for the present technology might be implemented, and are not intended to suggest any limitation as to the scope of use or functionality of the present technology. Neither should such electronic systems be interpreted as having any dependency or requirement relating to any one or combination of components illustrated in the disclosed examples.

As previously noted, the present technology may be described in the general context of computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. A method of evaluating an implementation of a database management system (DBMS), said method comprising:
    collecting data associated with said implementation of said DBMS;
    accessing a database comprising a plurality of problems and their associated solutions, said solutions configured to remedy at least one problem from said plurality of problems;
    comparing said data associated with said implementation of said DBMS with said plurality of problems and identifying at least one problem associated with said DBMS based on said data associated with said implementation of said DBMS indicating at least that a table utilized by said DBMS is not associated with an index for locating data stored in the table or that the table is associated with more than one index for locating data stored in the table;
    generating a DBMS risk assessment report identifying said at least one problem associated with said DBMS and a solution configured to remedy said at least one problem; and
    adding preventative maintenance information to said DBMS risk assessment report, said preventative maintenance information configured to help prevent a problem associated with another DBMS from being associated with said DBMS at a subsequent time, said preventative maintenance information indicating customer satisfaction issues relating to performance problems, unexpected downtimes or recovery problems, or security issues.

2. The method of claim 1 wherein said collecting comprises manually collecting preliminary data from said DBMS and implementing a DBMS tool set that analyzes said preliminary data and automatically collects said data associated with said implementation of said DBMS depending on a substance of said preliminary data.

3. The method of claim 2 wherein said preliminary data comprises cluster information associated with said DBMS.

4. The method of claim 1 wherein said data associated with said implementation of said DBMS is selected from a group of data sources consisting of a server configuration, a database configuration, security information, login information, index analysis information, and counter data.

5. The method of claim 1 wherein said at least one problem is a potential problem that may negatively affect an operation of said DBMS if action is not taken to remedy said potential problem.

6. The method of claim 1, further comprising:
    adding a link to said DBMS risk assessment report, said link identifying reference information corresponding to said at least one problem.

7. A risk assessment system for database management systems (DBMSs), said risk assessment system comprising:
    a scripting module that acquires data associated with a configuration of a first DBMS, generates a custom script configured to collect a set of data from said first DBMS, runs said custom script on said first DBMS, and loads said set of data into a database,
        said set of data comprising a plurality of issues associated with at least one operation of said first DBMS,
        said custom script configured to obtain index analysis information associated with a table utilized by said first DBMS and further configured to identify said index analysis information in said set of data in response to said index analysis information indicating that the table is not associated with an index for locating data stored in the table or that the table is associated with more than one index for locating data stored in the table,
        said custom script being customized according to operating parameters associated with an active server;
    an issue identification module that analyzes said set of data, identifies at least one issue from said plurality of issues corresponding to a problem associated with a second DBMS, generates a DBMS risk assessment report that identifies said at least one issue and that includes preventative maintenance information configured to help prevent a problem associated with said second DBMS from being associated with said first DBMS at a subsequent time, accesses a database of predefined issues comprising a set of problems associated with at least one other DBMS and a set of solutions that corresponds to said set of problems, and identifies at least one solution from said set of solutions,
        said preventative maintenance information indicating customer satisfaction issues relating to performance problems, unexpected downtimes or recovery problems, or security issues, and
        said at least one solution corresponding to said at least one issue; and
    at least one processor that implements the scripting module and the issue identification module.

8. The risk assessment system of claim 7, further comprising:
    an event analysis module that accesses an event log associated with an operating system that runs on said first DBMS, filters events from said event log, said filtered events comprising errors and warnings having transpired within a predefined period of time, identifies predefined recommendations that match said filtered events, and discloses said filtered events and said predefined recommendations.

9. The risk assessment system of claim 7, further comprising:
a counter data collection module that collects counter data associated with said first DBMS and loads said counter data into said database.

10. The risk assessment system of claim 7 wherein said at least one issue is a plurality of issues;
wherein said issue identification module sorts a first issue and a second issue from said plurality of issues according to a sorting criteria; and
wherein said issue identification module adds said first and second issues to said DBMS risk assessment report according to said sorting.

11. The risk assessment system of claim 10 wherein said sorting criteria utilizes a first potential risk associated with said first issue and a second potential risk associated with said second issue; and
wherein said issue identification module assesses said first and second potential risks to determine which of said first and second issues is more dangerous to an operation of said first DBMS to sort said first and second issues.

12. The risk assessment system of claim 7 wherein said issue identification module is configured to generate a slideshow document that presents said at least one issue.

13. The risk assessment system of claim 7 wherein said issue identification module is configured to generate a spreadsheet document comprising data associated with said at least one issue.

14. A computer-usable memory storing instructions that, when executed, cause a computer system to perform a method of evaluating an implementation of a first database management system (DBMS), said method comprising:
acquiring data associated with a configuration of said first DBMS;
generating a custom script for said first DBMS, said custom script being customized according to operating parameters associated with an active server;
running said custom script on said first DBMS, said custom script collecting a set of data from said first DBMS comprising a plurality of issues associated with at least one operation of said first DBMS;
generating a preliminary database comprising said set of data;
receiving feedback identifying at least one issue from said plurality of issues based on a problem associated with a second DBMS, the at least one issue including that a table utilized by said first DBMS is not associated with an index for locating data stored in the table or that the table is associated with more than one index for locating data stored in the table;
generating a DBMS risk assessment report that identifies said at least one issue and that includes preventative maintenance information configured to help prevent a problem associated with said second DBMS from being associated with said first DBMS at a subsequent time, said preventative maintenance information indicating customer satisfaction issues relating to performance problems, unexpected downtimes or recovery problems, or security issues;
accessing a database of predefined issues comprising a set of problems associated with at least one other DBMS and a set of solutions that corresponds to said set of problems; and
identifying in said DBMS risk assessment report at least one solution from said set of solutions, said at least one solution corresponding to said at least one issue.

15. The computer-usable memory of claim 14 wherein said method further comprises:
collecting counter data associated with said first DBMS; and
adding said counter data to said preliminary database.

16. The computer-usable memory of claim 14 wherein said at least one issue is a plurality of issues, and wherein said method further comprises:
sorting a first issue and a second issue from said plurality of issues according to a sorting criteria; and
adding said first and second issues to said DBMS risk assessment report according to said sorting.

17. The computer-usable memory of claim 16 wherein said sorting criteria utilizes a first potential risk associated with said first issue and a second potential risk associated with said second issue, and wherein said sorting of said first and second issues comprises an assessment of said first and second potential risks to determine which of said first and second issues is more dangerous to an operation of said first DBMS.

18. The computer-usable memory of claim 14 wherein said method further comprises:
accessing an event log associated with an operating system that runs on said first DBMS;
filtering events from said event log, said filtered events comprising errors and warnings having transpired within a predefined period of time;
identifying predefined recommendations that match said filtered events; and
disclosing said filtered events and said predefined recommendations in said DBMS risk assessment report.

19. The computer-usable memory of claim 14 wherein said method further comprises:
generating a slideshow document that presents said at least one issue.

20. The computer-usable memory of claim 14 wherein said method further comprises:
generating a spreadsheet document comprising data associated with said at least one issue.

* * * * *